May 10, 1927.  
C. W. FREDERICK  
1,627,892
LENS
Filed June 5, 1922  2 Sheets-Sheet 1
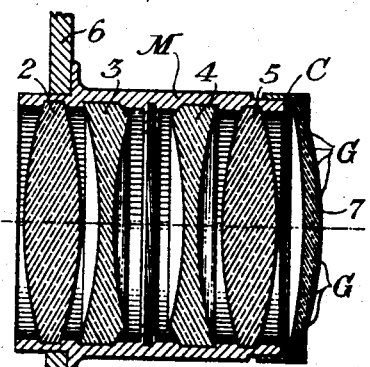
FIG_1_
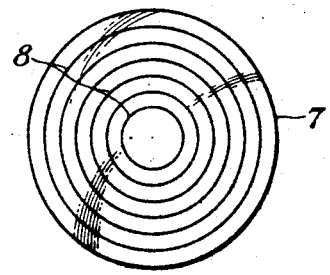
FIG_2_
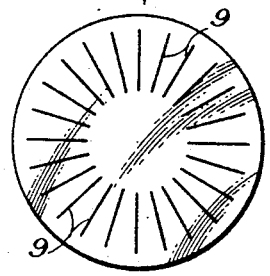
FIG_3_
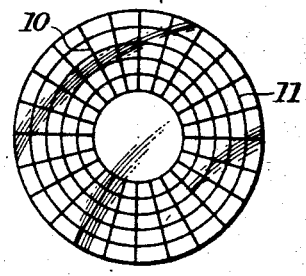
FIG_4_
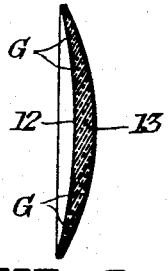
FIG_5_
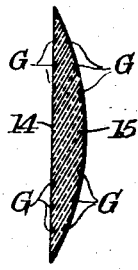
FIG_6_
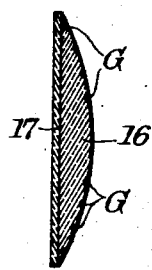
FIG_7_
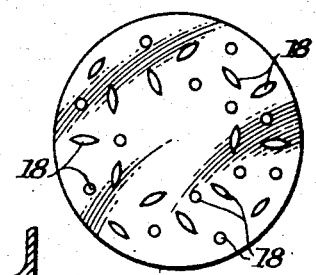
FIG_9_
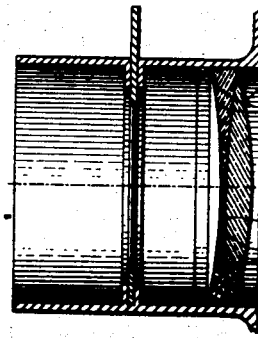
FIG_8_
INVENTOR  
Charles W. Frederick,  
BY  
ATTORNEYS May 10, 1927.　　　　　C. W. FREDERICK　　　　　1,627,892
LENS
Filed June 5, 1922　　　2 Sheets-Sheet 2

INVENTOR
Charles W. Frederick,
ATTORNEYS.

Patented May 10, 1927.

1,627,892

UNITED STATES PATENT OFFICE.

CHARLES W. FREDERICK, OF ROCHESTER, NEW YORK, ASSIGNOR TO EASTMAN KODAK COMPANY, OF ROCHESTER, NEW YORK, A CORPORATION OF NEW YORK.

LENS.

Application filed June 5, 1922. Serial No. 565,956.

This invention relates to a lens constructed to introduce a determined amount of aberration into an optical system and is a specific embodiment of the invention broadly covered in the patent to Frederick and Hopkins, 1,370,885 granted March 8, 1921. That patent discloses an element by means of which a determined amount of aberration is introduced into a well corrected objective for the purpose of obtaining a desirable degree of diffusion in a photographic or projected image. In the forms specifically described in that patent the diffusing grooves are located on an element having parallel flat sides. In the form herein described the diffusing grooves are located on an element of the lens system proper, that is, the element bearing the grooves has also one or more curved surfaces and has a finite focal length, determining with the other lens elements the equivalent focal length of the system, as distinguished from an element with flat sides which may be considered as having an infinite focal length and the insertion or removal of which does not affect the equivalent focal length of the system.

A particularly useful embodiment of my invention is as an attachment for use with corrected photographic objectives, serving both as a supplemental lens to modify the equivalent focal length of the system and as a diffusing attachment to introduce a desired amount of softness or diffusion into the photographic image.

For a more thorough understanding of my invention, reference will now be made to the accompanying drawings in which like reference characters designate like parts throughout, and in which Fig. 1 is a section of a mounted, corrected objective with my combined attachment;

Figs. 2, 3 and 4 are diagrammatic views showing designs in which the grooves may be formed on a lens surface;

Figs. 5 and 6 are sections of lenses having diffusing grooves;

Fig. 7 is a section of a lens having grooves and also having a light filter mounted therewith;

Fig. 8 is a view of a lens with a differently arranged series of grooves;

Fig. 9 is a section of a mounted, corrected objective with grooves on a fixed lens;

The theory underlying the introduction of a desired determined amount of diffusion into a corrected lens system by means of polished grooves is developed at some length in the patent mentioned. A few further theoretical remarks will however be made to show this application of the theory.

Figure 10:
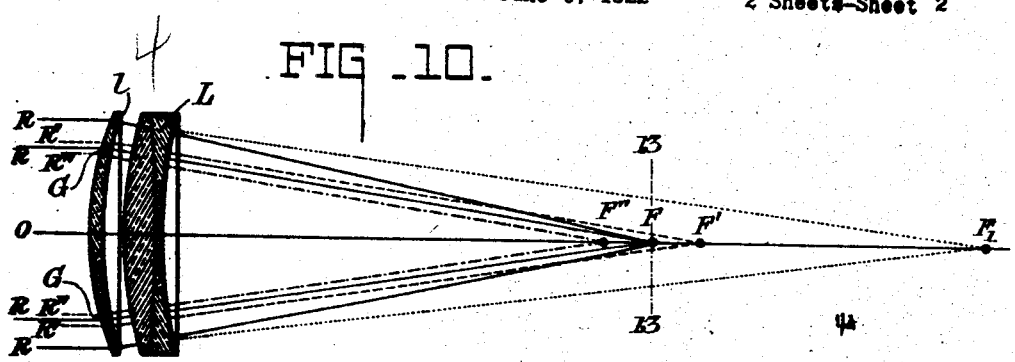
Fig. 10 is a diagram used in explaining the theory underlying my invention.
Figure 13:
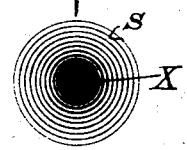
Fig. 13 is a diagram used to show the nature of the image on the plane 13—13 of Fig. 10.

In Fig. 10 L represents diagrammatically a well corrected objective of any type, which alone would bring to a focus at a point $F_1$ on its axis parallel rays from a distant point on the axis extended beyond O. In front of this objective is placed a supplemental positive meniscus lens 1, having the usual regularly curved surfaces and having grooves, indicated at G. A series of rays from a distant object are shown. Those indicated by full lines R fall on the regularly curved surface or on certain points in the bottom of the grooves and then pass through the objective, coming together at the focal point F which is the focus of the lens system as a whole. The addition of the supplemental lens has the effect of moving the focus from $F_1$ to F. Those rays R' which fall on the curved sides of the grooves farther from the axis are indicated by broken lines and are refracted as shown and impinge the front surface of objective L at a further distance from the axis than they otherwise would and intersect the axis beyond F, the limiting point being F'. Those rays R", shown in dot-dash lines, which fall on the curved sides of the grooves nearer the axis will be refracted as shown and impinge the front surface of objective L nearer the axis than they otherwise would and intersect the axis inside the point F, the limiting point being F". It is evident that a plane 13—13 passed through F at a right angle to the axis will show a circular instead of a point image, and such an image, much enlarged, is indicated in Fig. 13. The size of the image will depend on the maximum refraction of the rays before striking the objective L, and this depends upon the maximum slope of the grooves. The objective L is assumed to be corrected and capable of bringing rays from a point to a focus within an area known as the "circle of confusion" and ranging in diameter from 1/200th to 1/50th of an inch depending on the size, quality and purpose of the lens. This normal image or circle of confusion is indicated in solid block at X. The outer circle S is the limiting one for the rays undergoing maximum refraction. The proportion of rays passing to the normal image X, depends on the proportion of rays passing through the lens system without refraction due to the grooves, and the number of rays passing to the various zones within the circle S depends on the number, design and section of the grooves. It is possible, therefore, by modifying the number of grooves, their cross section, and the pattern made by them, to vary the effect of the rays; and the image thus determined controls the effect, artistic or otherwise, of the reproduced image.

In Fig. 1, I have shown a type of highly corrected objective in extensive use for photographic and projecting purposes having four lens elements 2, 3, 4 and 5 in a mount M, carried by a lens board 6, and having over the front end of the mount an annular cap C carrying a supplemental lens 7 having grooves G in its outer surface. These may be merely a series of concentric annular grooves as shown at 8 in Fig. 2. If desired the grooves may be radial as at 9 in Fig. 3, or both radial and annular as shown at 10 and 11 in Fig. 4. As these figures merely indicate the design, single lines are used to show the grooves. The grooves G may be on the concave side 12 of a meniscus lens 13 as shown in Fig. 5, or on the plane surface 14 of a plano-convex lens 15 as shown in Fig. 6, this figure showing them also on the curved surface. In Fig. 7 is shown a plano-convex lens 16, having grooves G on one surface and a color filter 17 mounted against the other surface. In Fig. 8 there is shown a series of small grooves 18 differing in size and shape but grouped symmetrically around the axis of the lens. In each of the forms mentioned there is a series of grooves grouped in an annular band or region about an ungrooved central area, and introducing into the lens system a certain amount of aberration that is symmetrical with respect to its axis. As is evident from Fig. 10 some of this aberration is positive and some is negative so that preferably it does not as a whole over-correct or under-correct the aberration of the system.

Figure 12:
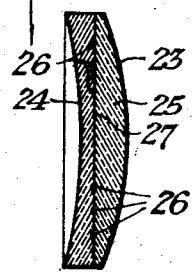
Fig. 12 is a section of a cemented lens with grooves on one of the cemented surfaces.

In Fig. 9 there is shown a mounted corrected objective 20 consisting of two cemented lens elements 21 and 22 upon one of which the grooves G are formed. In Fig. 12 is shown a corrected objective 23 consisting of a flint negative lens 24 and a crown positive lens 25, grooves 26 being formed upon a cemented surface 27 of element 24. In such a case it is generally desirable that the grooves be on the flint element since the Canada balsam used as a cement has a refractive index close to that of common crown. The grooves must also in this case be much deeper to introduce the same diffusion as grooves on a surface exposed to air.

Figure 11:
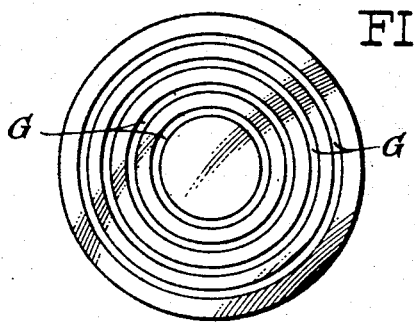
Fig. 11 is a face view of a lens embodying my invention.

In Fig. 11 I have shown, enlarged and drawn approximately to scale, a lens with a series of grooves G as designed for general use on a small hand camera. The lens has a diameter of about 38 mm. and four annular concentric grooves are made, the centers of the grooves being distant from the axis 7, 10, 13 and 16 mm. respectively. The grooves are about 1 mm. wide. A computation of the total area of the surface and of the grooves will disclose that the grooves occupy approximately twenty per cent of the surface. I have found that this introduces into the system an amount of aberration such that the photographic images are given a pleasing amount of diffusion. Of course, the amount of diffusion to be introduced is largely a matter of taste, and depends also on the nature of the subject and the purpose of the photograph. But it may be stated that for pictorial purposes, when twenty per cent, or even less, of the rays passing through a corrected system are subjected to aberration controlled by polished grooves the resulting image is generally considered pleasing, and that the more pronounced diffusion caused by thus affecting as high as twenty-five or thirty per cent is pleasing on some subjects and to many persons, but that when over a third of the rays are thus affected the results are not considered desirable except to workers whose tastes run to unusually bizarre or impressionistic effects.

As in the patent referred to, the grooves are carefully formed or "polished", meaning thereby having smooth walls of determined shape. Because of the control over the curvature of the wall, there is no general diffused or scattered light or haze introduced by the grooves, which would merely fog the entire picture area, reducing contrast and producing a picture that is merely fuzzy; but the rays from any point in focus are deviated not more than a predetermined extent, as indicated by the circle S, so that the character of the reproduced image is controlled and the contrasts are maintained. Experience has shown that a desirable size for the circle S is about one per cent of the equivalent focal length of the system, but I do not limit myself to this proportion.

Figure 14:
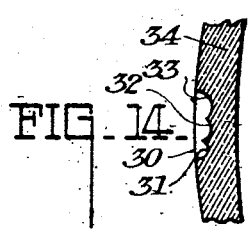
Fig. 14 shows a fragmentary section of a lens with a conformed groove.

Reference is further made to the mentioned patent for suggestions as to patterns and forms of grooves, which preferably, as in the patent, have rounded walls. A single groove may, however, have portions of different curvature, being a compound groove, as it were, as indicated in Fig. 14 in which is illustrated, a groove 30 made by grinding three overlapping grooves 31, 32 and 33 of different curvature and depth in a surface of lens 34.

Figure 15:
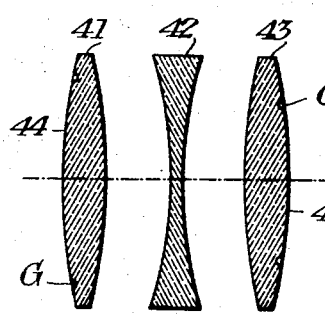
Fig. 15 shows a section of an objective with grooves on more than one lens thereof.

For convenience of manufacture the grooves are usually made on one surface of a single lens, but as indicated in Fig. 6 they may be on both surfaces of a lens, or they may be on different lenses of the same objective or lens system as indicated in Fig. 15. Here the objective comprises three lenses 41, 42 and 43, there being grooves G in the surfaces 44 and 45 of the elements 41 and 43 respectively. In such a case, however, the number of grooves is limited so as not to intercept more than the desired proportion of the rays transmitted through the lens system.

The quality of image resulting from a pattern of grooves formed on a curved lens surface differs from that of an image resulting from a similar pattern formed on a plane surface, probably due to the fact that the edges of the outer and inner walls of the groove are not in the same plane perpendicular to the lens axis.

It is obvious that the form herein described is of particular utility to users of small hand cameras. The introduction of controlled aberration has been found especially desirable in portraiture since it softens wrinkles and hard facial lines and blemishes and lessens the necessity of retouching. But since small cameras are frequently not adapted for portraiture without the use of supplemental lenses, it becomes very simple to modify the focal length of the camera lens and at the same time to introduce the desired diffusion.

It is obvious that numerous modifications may be made within the scope of my invention as defined in the appended claims.

Having thus described my invention, what I claim as new and desire to secure by Letters Patent is:

1. A photographic lens with axially symmetrical surfaces and with a finite focal length having on a surface thereof a series of polished shallow grooves comprising, as a whole, a group symmetrical with respect to the lens axis, said grooves covering less than one-third of such surface.

2. A photographic lens with axially symmetrical surfaces and a focal length sufficiently short to change appreciably the effective focal length of a corrected photographic objective and adapted for use with such a corrected objective, and having on at least one surface, a series of polished grooves arranged around the axis of such lens in such a way as to introduce, symmetrically of the axis, a determined amount of positive and negative aberration.

3. A corrected photographic lens system comprising as an element thereof a lens of finite focal length having on a surface thereof, a series of polished grooves so shaped as to introduce into the system a determined amount of aberration, the system being capable of collecting the rays reaching it from a point in one focal plane and concentrating them in an area in the conjugate focal plane, said area having a diameter substantially one-one hundredth of the equivalent focal length of the system and of highly concentrating at least two-thirds of such rays in a very small nucleus in such area.

Signed at Rochester, New York, this 27th day of May 1922.

CHARLES W. FREDERICK.